United States Patent [19]

Nankivil

[11] Patent Number: 4,888,477
[45] Date of Patent: Dec. 19, 1989

[54] RANGE MEASUREMENT FOR ACTIVE OPTICAL RECOGNITION DEVICES

[75] Inventor: Donald B. Nankivil, Santa Ana, Calif.

[73] Assignee: Ford Aerospace Corporation, Newport Beach, Calif.

[21] Appl. No.: 266,736

[22] Filed: Nov. 3, 1988

[51] Int. Cl.$^4$ ................................................ G01C 3/08
[52] U.S. Cl. ......................................... 250/201; 356/5
[58] Field of Search ..................... 250/201; 356/4, 5; 342/134, 135

[56] References Cited

U.S. PATENT DOCUMENTS

| | | | |
|---|---|---|---|
| 4,139,301 | 2/1979 | Chaborski | 356/5 |
| 4,464,048 | 8/1984 | Farlow | 356/5 |
| 4,538,907 | 9/1985 | Rocchi | 356/5 |
| 4,699,508 | 10/1987 | Bolkow et al. | 356/5 |
| 4,734,587 | 3/1988 | Schwarte | 356/5 |
| 4,770,526 | 9/1988 | Manhart et al. | 356/4 |
| 4,827,317 | 5/1989 | Mizushima et al. | 356/5 |

Primary Examiner—Edward P. Westin
Attorney, Agent, or Firm—Harry G. Weissenberger; Edward J. Radlo; Keith L. Zerschling

[57] ABSTRACT

An inexpensive, reliable analog ramped-voltage timing device (34, 36, 38, 40, 44) can be used in a laser echo ranging device capable of resolution in the decimeter range by using a very steep ramp (42), and a flash A/D converter (50) to instantaneouly sample the ramped voltage upon receipt of the laser echo.

8 Claims, 2 Drawing Sheets

4,888,477

RANGE MEASUREMENT FOR ACTIVE OPTICAL RECOGNITION DEVICES

FIELD OF THE INVENTION

This invention relates to a system for accurately measuring distances over a wide range down to about a decimeter by using a laser.

BACKGROUND OF THE INVENTION

In a number of applications, it is desirable to recognize an object and map its shape and position by observing it with a laser both at a distance and at close proximity. For example, a system with this capability might be used in an airborne vehicle overflying a terrain at very low altitude.

Such recognition and mapping requires an accurate measurement of distance over a range extending from kilometers down to about a decimeter. Because light travels at the rate of about 30 cm/ns, the accurate measurement of such a distance requires operation of the measuring citrcuitry at a frequency in the gigahertz range.

It has been proposed to measure the elapsed time between the transmission and the receipt of a laser pulse in a system of this type by means of a gallium arsenide (GaAs) digital counter. Although such counters are technically feasible, circuit board layout becomes critical for a counter operating in the gigahertz range, and there is a considerable risk of unpredictable malfunctions. In addition, GaAs digital counters are prohibitively expensive for reasonably priced ranging apparatus.

Timing methods involving sampling a ramped analog voltage and digitizing the sample have been used in other technologies. That approach would not only be economically attractive, but it would also overcome the layout and reliability problems of gigahertz-range GaAs counters. However, the use of ramped-voltage timing techniques was traditionally considered too slow to be useful in the gigahertz environment of short-distance laser ranging devices.

Prior art in this field includes U.S. Pat. No. 4,139,301 which describes an input rectifier circuit for a laser distance measuring system; U.S. Pat. No. 4,464,048 which discloses a temperature-compensated and scatter-eliminating receiver for a laser distance measuring device; U.S. Pat. No. 4,538,907 which concerns a laser ranging device involving a comparison of the timing of a direct and a reflected laser pulse; U.S. Pat. No. 4,734,587 which describes a laser distance measuring system using a clock pulse counter; and U.S. Pat. No. 4,669,508 which shows a high-precision laser distance measuring device comparing a target beam with a reference beam whose path length is known.

DISCLOSURE OF THE INVENTION

It has now been found that ramped-voltage timing can successfully be used in short-range laser ranging devices by providing a flash analog-to-digital (A/D) converter (50) sampling a very steep voltage ramp (42) which is initiated by a high-speed switch (34) triggered upon the transmission of a laser pulse.

The flash A/D converter latches the instantaneous value of the ramped voltage when the reflected laser pulse is received by the laser receiver (20), which then provides an instantaneous digital output corresponding to the transit time of the laser pulse. ECL logic is used in the pulse generator and receiver sections (10, 20, 24, 28) to provide the necessary speed. The ECL logic signals (26, 30) are converted to TTL logic signals by an appropriate converter (32) prior to application of the ramp sampling pulse (30) to the flash A/D converter (50), and prior to application of the ramp initiation or switching control pulse (26) to the high speed switch (34).

DESCRIPTION OF THE PREFERRED EMBODIMENT

Figure 1A:
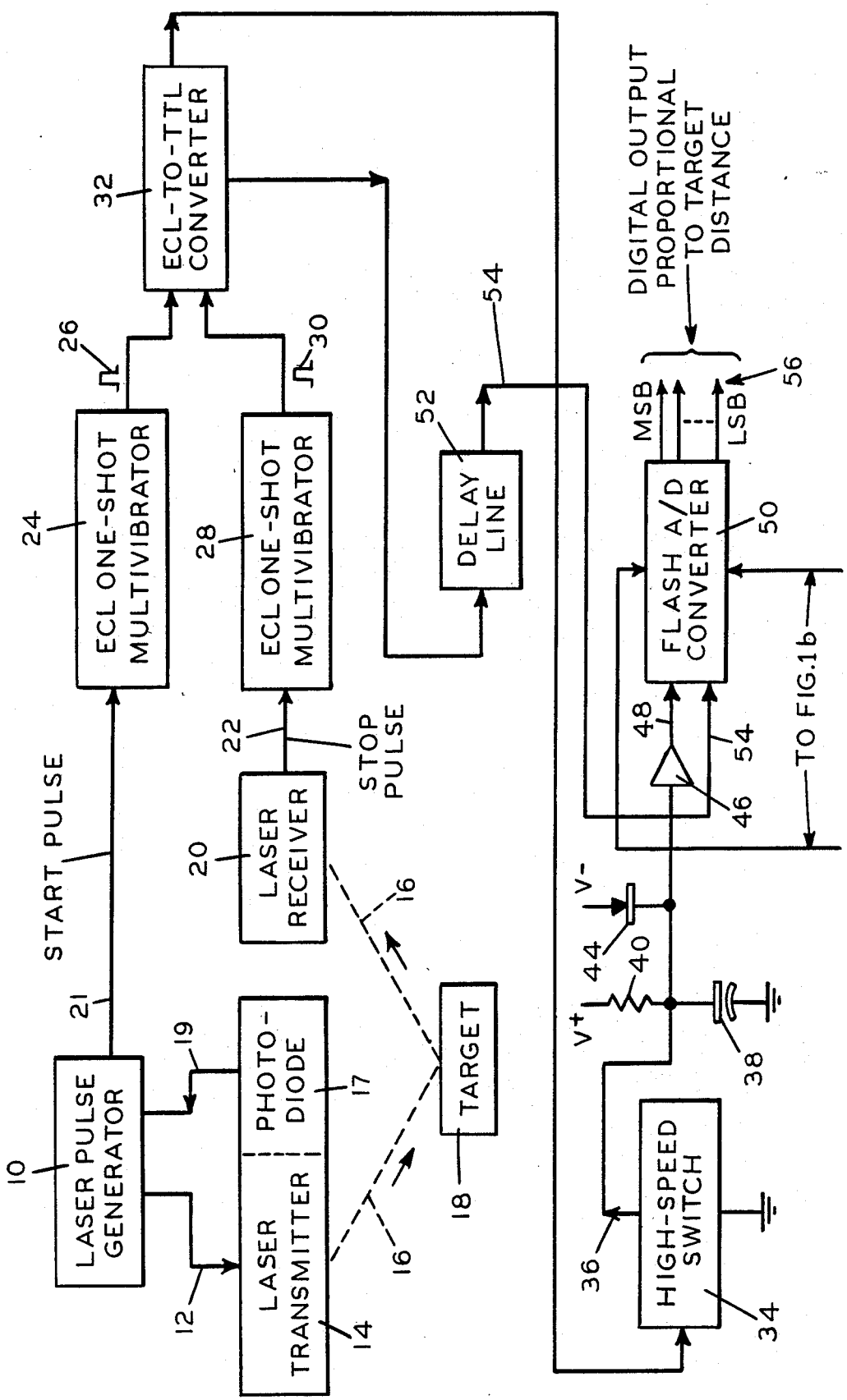
FIGS. 1a and 1b, taken together, are a block diagram of the short-range laser distance measuring device of this invention.
Figure 1B:
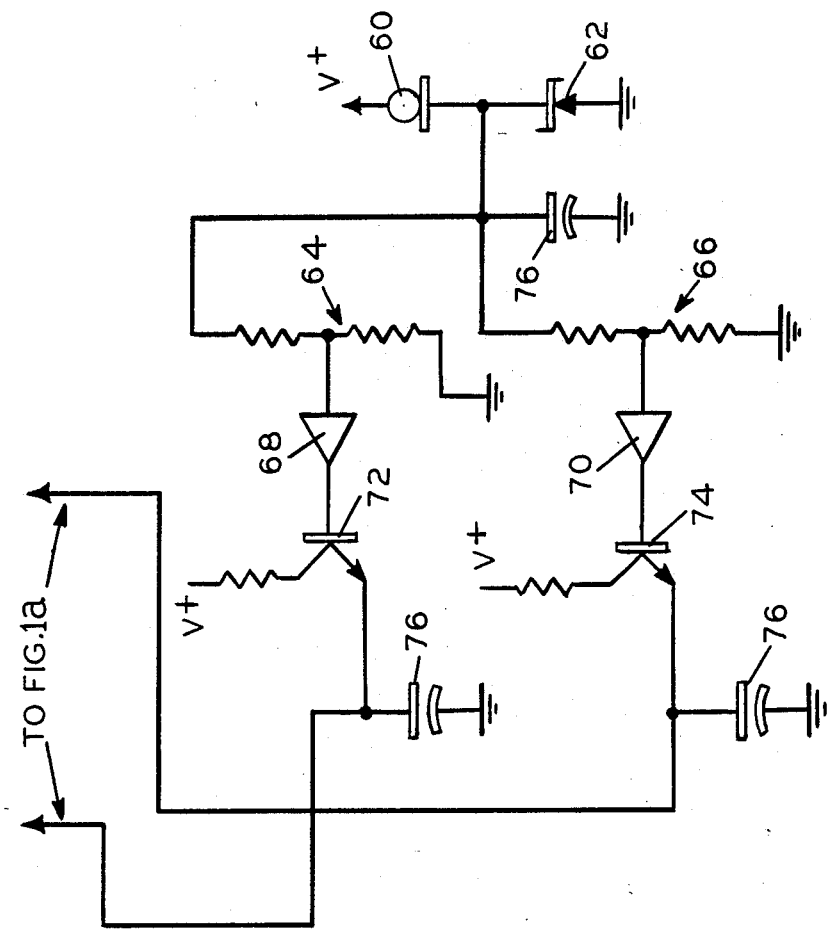

In FIGS. 1a and 1b, a laser pulse generator 10 produces a pulse 12 which triggers the laser transmitter 14 to transmit a light pulse 16 toward the target 18 at intervals of, e.g., 100 $\mu$s. A laser cavity mounted photodiode (17) senses the instant that the laser fires, thereby generating a trigger pulse (19). This pulse in turn trips an ECL comparator in the laser pulse generator (10) to generate a start pulse (21). When a reflected light pulse 16 is received by the laser receiver 20, a stop pulse 22 is produced by an ECL comparator in the receiver 20. The start pulse 21 triggers and ECL one-shot multivibrator 24 which generates a switch control pulse 26 of fixed duration. Likewise, the stop pulse 22 triggers the ECL one-shot multivibrator 28 which generates a ramp sampling pulse 30 of fixed duration.

ECL logic is needed for the circuitry of the comparators in pulse generator 10 and receiver 20, as well as in the multivibrators 24, 28, because of its faster operation. The high-speed switch 34, A/D converter 50 and delay line 52, however, all require TTL input logic. For this reason, the pulses 26, 30 are converted to TTL logic in the ECL-to-TTL converter 32.

The converted switch control pulse 26 is applied to a high-speed switch 34 which normally grounds lead 36 but breaks that ground connection during the presence of the switching pulse 26. When the ground connection of lead 36 is broken, the ramp capacitor 38 rapidly charges through the resistor 40. The circuit parameters are so selected as to make the charging curve extremely steep, e.g. one volt in sixty-three nanoseconds in a preferred embodiment. In that part of the charging curve, the voltage-time relationship is essentially linear, so that the voltage at 36 is directly proportional to the time from the leading edge of the switch control pulse 26.

Figure 2:
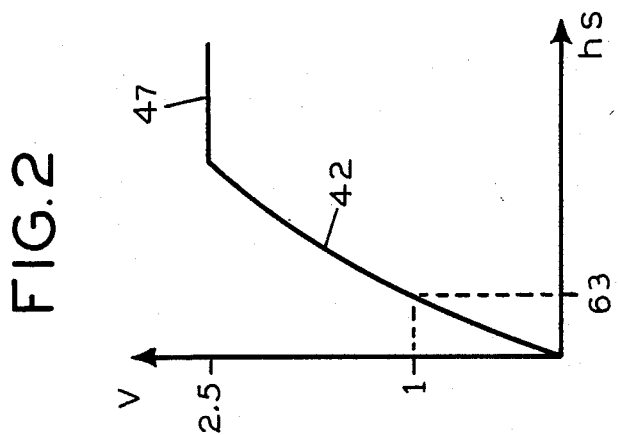
FIG. 2 is a time-amplitude diagram illustrating the analog ramp voltage at the input to the flash A/D converter used in the invention.

In the preferred embodiment shown in the drawings, distances are digitally measured in increments of about 15 cm, which correspond to round-trip beam travel increments of one nanosecond. Using a six-digit A/D converter, this provides a measurement range of about 0–9.6 m. If the circuit parameters are so chosen as to provide a charging rate of 63 ns/V (FIG. 2) for the capacitor 38, and V+ is 15 V, the charging curve 42 of FIG. 2 is sufficiently linear over the 63 ns maximum measurement range to be accurate to the nearest nanosecond throughout the range. If a larger range is provided by using an A/D converter with more digits, a constant-current diode may have to be substituted for the resistor 40 to keep the charging curve 42 linear throughout the range of interest.

Zener diode 44 limits the input voltage to the unity-gain buffer amplifier amplifier 46 to a safe value 47 (FIG. 2). The output of the buffer amplifier 46 is the ramp voltage 42 of FIG. 2, which is applied to the signal input 48 of the flash A/D converter 50.

The TTL-converted ramp sampling pulse 30 is delayed in TTL delay line 52 by an amount appropriate to compensate for circuit delays. The output of delay line 52 is a sampling pulse which is applied to the sample input 54 of the flash A/D converter 50.

The flash A/D converter 50 is so constructed as to simultaneously apply the voltage existing at its signal input 48, on the leading edge of the ramp sampling pulse 30 applied to its sample input 54, to a bank of comparators which instantly produce a digital representation of that voltage of the output lines 56. This digital representation of range is suitable for use in mapping devices or the like (not shown).

The flash A/D converter 50 requires a highly stable DC reference voltage supply. In the preferred embodiment of FIG. 1, this reference is provided by constant-current diode 60, zener diode 62, voltage dividers 64, 66, operational amplifiers 68, 70, and transistors 72, 74. Any spurious AC components are eliminated by capacitors 76.

The extremely fast operation of the flash A/D converter 50 makes it possible to obtain a sufficiently accurate digital readout of the sampled ramp voltage in spite of the extreme steepness of the ramp, and thereby makes possible the use of the relatively inexpensive analog ramp-voltage timing system of FIG. 1.

I claim:

1. A laser range echo device for measuring distances in the decimeter range, comprising:
   (a) laser beam transmitting means for transmitting a pulse of laser light toward a target;
   (b) start pulse generating means for generating a start pulse upon transmission of said laser pulse;
   (c) laser receiver means for generating a stop pulse in response to the receipt of the reflection of said laser light pulse from said target;
   (d) a high-speed switch arranged to be actuated for a predetermined time following the onset of said start pulse;
   (e) capacitive means for producing a ramp voltage in response to the actuation of said switch, said ramped voltage changing substantially linearly from a starting value to an ending value in a matter of nanoseconds; and
   (f) a flash A/D converter arranged to sample the instantaneous value of said ramped voltage in response to said stop pulse;
   (g) whereby said flash A/D converter provides a digital representation of said instantaneous value with an accuracy sufficient to digitally represent the travel distance of said laser light pulse in increments in the decimeter range.

2. The device of claim 1, further comprising a one-shot multivibrator which is triggered by said start pulse, and whose output actuates said high-speed switch.

3. The device of claim 1, further comprising a one-shot multivibrator triggered by said stop pulse, the output of said multivibrator being operatively applied to said flash A/D converter to sample said instantaneous value.

4. The device of claim 3, further comprising a delay line interposed between said multivibrator and said flash A/D converter to delay said multivibrator output so as to compensate for delays in the production and transmission of said ramp voltage signal.

5. The device of claim 1, further comprising:
   (h) a pair of multivibrators triggered, respectively, by said start and stop pulses to produce pulses of predetermined duration for operating said high-speed switch means and said flash A/D converter, said multivibrators being ECL logic devices while said switch means and converter are TTL logic devices, and
   (i) an ECL-to-TTL converter interposed, respectively, between said multivibrators and said switch means and converter.

6. The device of claim 5, further comprising:
   (j) a TTL delay line interposed between said ECL-to-TTL converter and said flash A/D converter for delaying said converter operating pulse.

7. The device of claim 1, further comprising limiting means for limiting the range of said ramp voltage.

8. The device of claim 1, further including a stable DC supply for said flash A/D converter.

* * * * *